United States Patent [19]

Hino et al.

[11] Patent Number: 5,083,286
[45] Date of Patent: Jan. 21, 1992

[54] IMAGE FORMING APPARATUS RECEIVING EXTERNAL DATA TO PERFORM A PREDETERMINED PROCESS

[75] Inventors: Rika Hino, Tokyo; Kimio Osawa, Yokohama, both of Japan

[73] Assignee: Kabushiki Kaisha Toshiba, Kawasaki, Japan

[21] Appl. No.: 413,303

[22] Filed: Sep. 27, 1989

[30] Foreign Application Priority Data

Sep. 30, 1988 [JP]  Japan .................................. 63-245999

[51] Int. Cl.⁵ .......................................... G06K 19/00
[52] U.S. Cl. ................................................ 395/115
[58] Field of Search ...................... 364/518, 521, 519; 365/52; 355/206, 271, 133, 202, 209; 434/156, 157

[56] References Cited

U.S. PATENT DOCUMENTS 3,988,721 10/1976 Frutiger ........................ 340/173 R
4,826,332 5/1989 Ukai et al. .............................. 400/70
4,979,144 12/1990 Mizuta .................................. 364/900
4,980,856 12/1990 Ueno .................................... 364/900
4,985,920 1/1991 Seki .................................. 235/380 X

FOREIGN PATENT DOCUMENTS 3247791 7/1983 Fed. Rep. of Germany .

OTHER PUBLICATIONS

Hewlett Packard User Manual, Aug. 1986, pp. 4-7--4-10.

Primary Examiner—Heather R. Herndon
Attorney, Agent, or Firm—Foley & Lardner

[57] ABSTRACT

Initialization data for an image forming apparatus is first down-loaded from a host device to a RAM and then written in an IC card. Once the initialization data is written in the IC card, future initialization will be executed on the basis of the initialization data read out from the IC card, not from the host device.

8 Claims, 8 Drawing Sheets

ID_FORMING APPARATUS RECEIVING
EXTERNAL DATA TO PERFORM A
PREDETERMINED PROCESS

BACKGROUND OF THE INVENTION

1. Field of the Invention

The present invention relates to image forming apparatuses such as a laser printer and an electronic copying machine, which form an image in accordance with image data sent from a host device.

2. Description of the Related Art

According to conventional image forming apparatuses, in altering an operation mode which is not built in the image forming apparatus, data such as emulation data and font data (hereinafter referred to as down-load data) is down-loaded to an image forming apparatus from a computer as a host device, an image scanner or the like, and data necessary for the apparatus to perform a predetermined operation is set to the individual units of the apparatus, thus executing initialization.

When the down-load data is set where necessary, the image forming apparatus becomes ready to form an image in accordance with image data sent from the host device.

According to such conventional image forming apparatuses, however, down-load data should be down-loaded from a host device every time power is turned on or an operation mode is changed. The down-loading occupies the host device every time and significantly impairs the effective use of the host device.

As one of a possible image forming apparatuses (not a power art), there may be an apparatus which employs an IC card (portable memory medium) having a program, fonts and other various data stored in an integrated circuit chip mounted therein and loads these data as desired into a RAM provided in the image forming apparatus to execute an operation. When the IC card is inserted in or removed from the apparatus which has already been activated to be ready for operation, noise may occur at the connector section of the apparatus which receives the IC card, thus destroying the memory contents in both the IC card and the image forming apparatus.

Further, conventional IC cards for use in the possible image forming apparatuses, even they are of different types, have the similar or the same external appearances, so that it becomes difficult to select the proper type, thus making the use of the IC cards inconvenient.

SUMMARY OF THE INVENTION

It is an object of this invention to provide an image forming apparatus which make down-loading of down-load data from a host device unnecessary every time the apparatus is activated or the operation mode is changed, permits a portable memory medium to be inserted into or removed from the activated apparatus, uses portable memory media whose types can be apparently distinguished, and is therefore easy to operate.

To achieve the object, there is provided an image forming apparatus which is initialized by down-loading predetermined data from a host device to load memory means for storing the predetermined data and loads data from a portable memory medium into said load memory means, said apparatus comprising:

first loading means to load said predetermined data to said load memory means from said host device;

first instruction means for giving an instruction to write the predetermined data stored in said load memory means into said portable memory medium from said load memory means;

second loading means for loading the predetermined data stored in said portable memory medium to said load memory means from said portable memory medium; and memory control means for writing into said portable memory medium said predetermined data loaded to said load memory means from said host device by said first loading means when instructed by said first instruction means, and loading said predetermined data stored in said portable memory medium to said load memory means when said portable memory medium having said predetermined data loaded thereto is set in said apparatus, thereby executing initialization of said image forming apparatus.

According to another aspect of an image forming apparatus according to claim 1, further comprising:

receiving means for receiving said portable memory medium;

second instruction means for giving a power supply instruction to supply power to said portable memory medium set in said receiving means or a power stop instruction to stop power supply to said portable memory medium; and supply or stoppage of power supply to said portable memory medium in accordance with the instructions from said second instruction means, whereby at a time said portable memory medium is set in or removed from said receiving means, power to said portable memory medium is cut off in response to the power stop instruction from said second instruction means, and when said portable memory medium is set in said receiving means, power is given to said portable memory medium in response to the power supply instruction from said second instruction means.

Both of the above image forming apparatuses has a further feature such that portable memory media for use in the apparatuses are colored differently depending on types thereof and types of data stored therein.

According to the present invention, in an image forming apparatus which down-loads predetermined data from a host device for initialization, data down-loaded from the host device first is stored in a portable memory medium, so that when this data should be down-loaded next time, it is loaded from the portable memory medium. This reduces a burden of the host device and improves the effective use thereof.

According to a modification of the present invention, control means for controlling power supply to the portable memory medium and cutoff of the power supply in accordance with an instruction from second instruction means, whereby inserting or removing of the portable memory medium is carried out while power supply to the portable memory medium is cut off by the control means, and power is given to the memory medium when the memory medium is surely inserted in the apparatus. This can prevent the otherwise possible data destruction, and makes the image forming apparatus easy to operate as it is unnecessary to cut off power to the overall apparatus.

Further, portable memory media for use in the image forming apparatus are colored differently depending on the types of data stored therein to avoid confusion, thus making the present image forming apparatus easier to operate.

DETAILED DESCRIPTION OF THE PREFERRED EMBODIMENT

Figure 1:
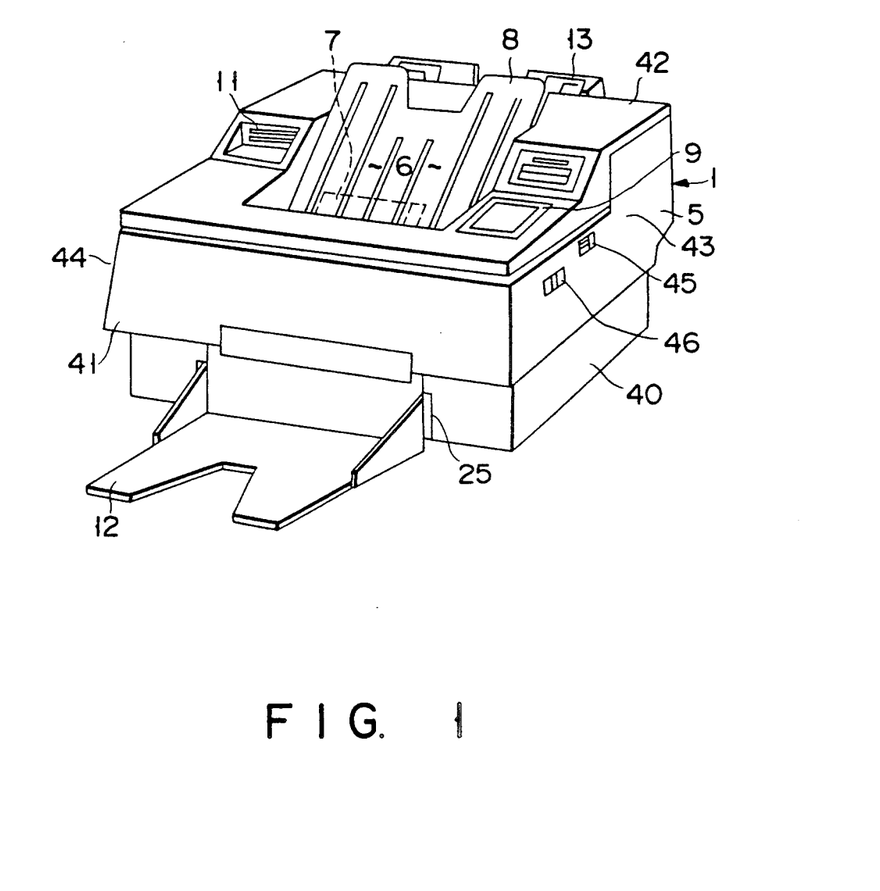
FIG. 1 is a perspective view illustrating the external appearance of an image forming apparatus according to one embodiment of the present invention.
Figure 2:
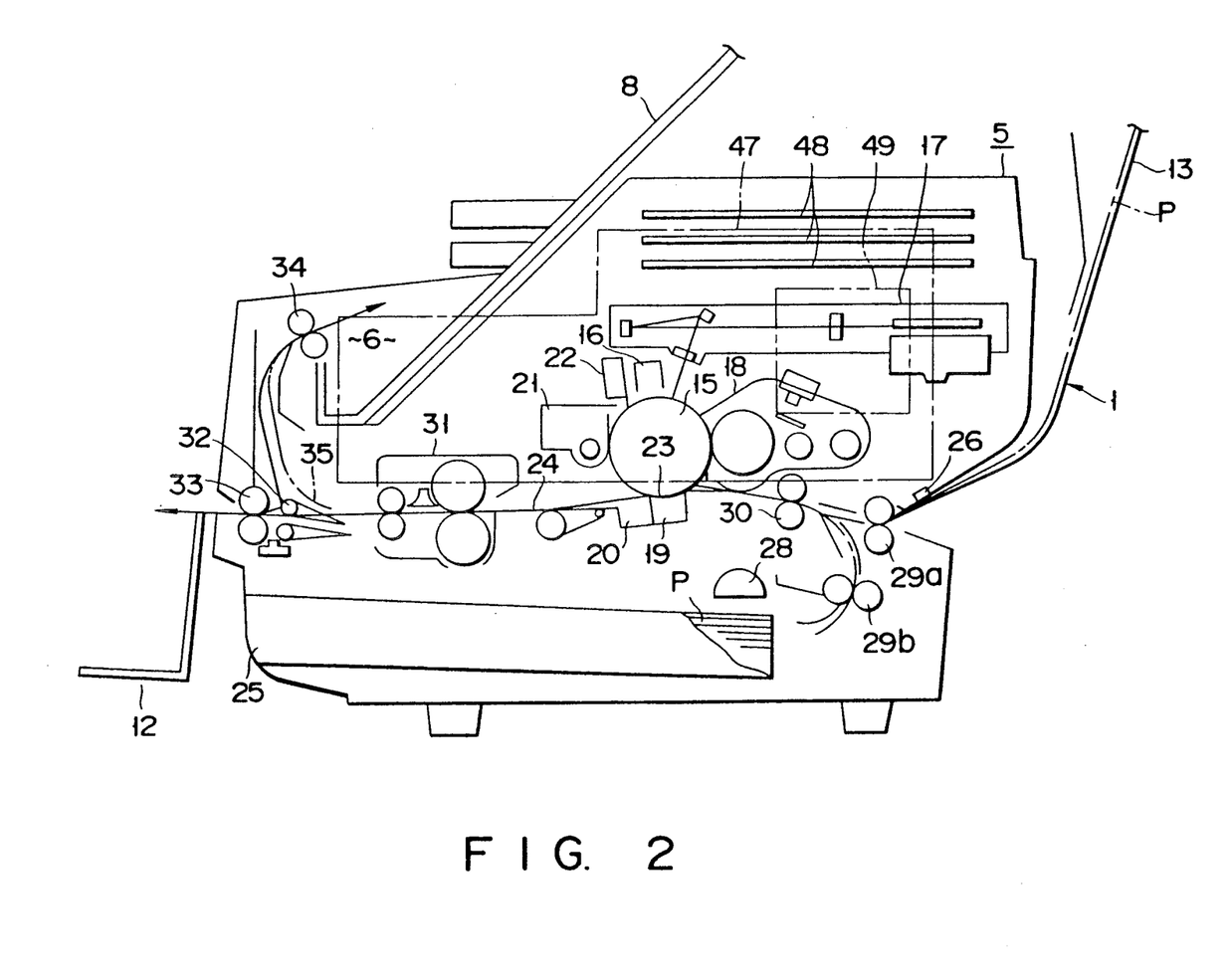
FIG. 2 is a schematic longitudinal cross section of the apparatus shown in FIG. 1.

A preferred embodiment of this invention will now be described referring to the accompanying drawings. FIG. 1 is a perspective view of the external appearance of an image forming unit apparatus equipped with a laser printer as the present image forming apparatus, and FIG. 2 is a schematic longitudinal cross section illustrating the internal structure of the apparatus.

Referring to the diagrams, numeral 1 denotes a laser printer as an image forming apparatus having the following structure.

Reference numeral 5 is the body of the laser printer 1, and the top rear portion of the printer body 5 is made higher than the front portion. A recessed portion 6 serving as a sheet discharging section is provided at the top center portion of the printer body 5. A sheet discharging tray 8 is mounted in the recessed portion 6 and is supported movable by a jogger 7. On the right side of the recessed portion 6 is an operation panel 9, and on the left side there are three IC-card slots 11.

Figure 3:
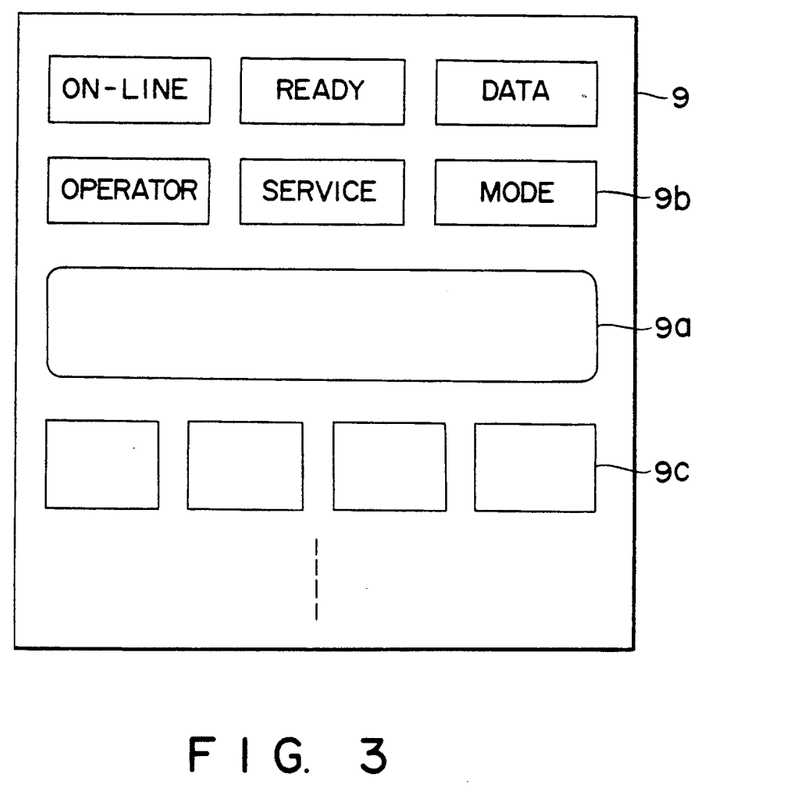
FIG. 3 is a diagram illustrating an arrangement of an operation panel of FIG. 1.

As shown in FIG. 3, the operation panel (first and second instruction means) 9 comprises an LCD (Liquid Crystal Display) unit 9a for displaying the number of sheets, a mode, etc., an LED (Light Emitting Diode) indicator 9b for indicating various statuses by turning LEDs on, and switches 9c for specifying various operations. The LED indicator 9b comprises LEDs which indicate whether or not the apparatus is coupled to an external unit (i.e., an ON/OFF-line mode), a print ready mode, a manual mode, print data transfer in progress, an operator's attention required (operator call) and attendance of a service man required (service man call).

The switches 9c include numeral (ten) keys, an ON/-OFF select key, a clear key, a YES key, a NO key, and an EXIT key, for example. The ten keys are used to set a number-of-copies setting mode, a paper source feed mode, a printing abort/sheet discharge mode, and the like.

Further, a sheet discharge tray 12 is mounted at the front of the printer body 5, and a manual feed tray 13 at the rear side.

A drum-shaped photosensitive member 15 serving as an image bearing member is shown in FIG. 2. Disposed around the photosensitive drum 5 are a charging unit 16, a laser optical system 17, a developing unit 18, a transfer unit 19, a separating unit 20 (the last three units serving as developing means), a cleaning unit 21 and a de-electrifying unit 22 (the last two units serving as cleaner means).

In the printer body 5 an image-support member conveying path 24 is formed passing through an image transfer section 23 between the photosensitive drum 15 and the transfer unit 19 and extending forward. A sheet of paper P automatically fed via a feed roller 28 and guide rollers 29 from a sheet feeding cassette 25 accommodated at the bottom portion in the printer body 5 or a sheet of paper P manually fed from the manual feed tray 13 is guided along this path 24 to the image transfer section 23.

A pair of aligning rollers 30 are disposed along the image-support member conveying path at the upstream of the image transfer section 23, and a fixing unit 31, a discharge sheet selector 32 and a pair of discharge rollers 33 ar disposed at the downstream of the section 23.

At the end of the path 24 is formed a branching path 35 provided with a pair of discharge rollers 34 along which paper P selected by the discharge sheet selector 32 is guided toward the recess portion 6 serving as a sheet discharging section.

Figure 4:
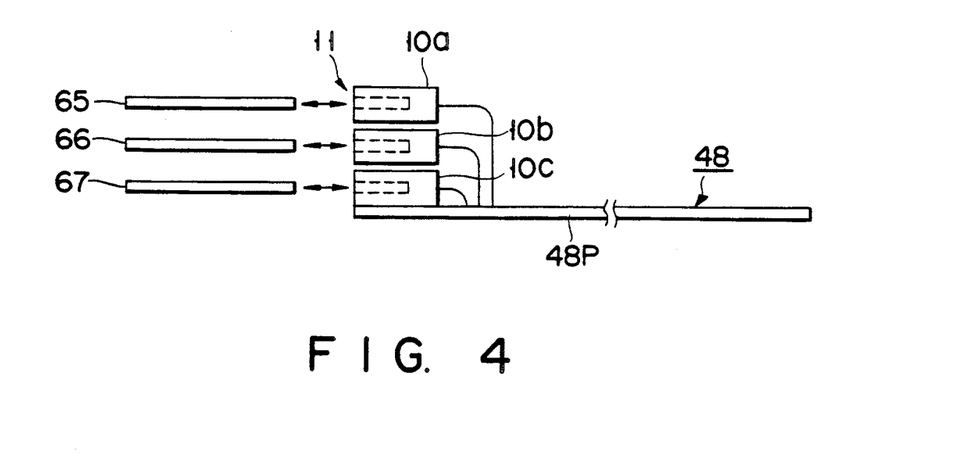
FIG. 4 is a diagram illustrating connection between an IC card and a circuit board having a control circuit mounted thereon.

Referring to FIG. 1, numeral 40 is a lower cover, numeral 41 is a front cover, numeral 42 is an upper cover, numeral 43 is an openable right cover (door), numeral 44 is a left cover, numeral 45 is a lever for opening or closing the right cover 43, and numeral 46 is a lever for opening or closing the upper unit. Referring to FIG. 2, numeral 47 denote a circuit board on which a printer circuit for controlling the operation of the printer itself is mounted, and numeral 48P denote a circuit board on which a printer control circuit 48 for controlling the operation of the printer circuits 49 is mounted. As shown in FIG. 4, the circuit board 48P having the printer control circuit 48 mounted thereon has three connectors (receiving means) 10a, 10b and 10c mounted directly at one end thereof, thus forming the IC-card slots 11 in which IC cards (portable memory media) 65, 66 and 67 are to be respectively inserted. This structure can eliminate the need to lay signal lines around by means of harnesses, thus shortening the lengths of the signal lines. This reduces a delay in the signal lines as well as a cross talk, thus ensuring a high-speed access to the IC cards 65–67.

In the image forming operation of the above apparatus, the photosensitive drum 15 is uniformly charged by the charging unit 16 and is then exposed to light by means of the laser optical system 17 in accordance with an image signal, thus forming an electrostatic latent image on the drum 15. This electrostatic latent image on the photosensitive drum 15 is developed by the developing unit 18 which uses a two-component developer D consisting of a toner and a carrier b, and the resultant developed image is sent to the image transfer section 23.

In synchronism with the above developing operation, the paper P fed out from the sheet cassette 25 or the manually-fed paper P is fed via the aligning roller pair 30 to the image transfer section 23 where the developed image is transferred on the paper P by the transfer unit 19. The paper P is then separated from the photosensitive drum 15 by the separating unit 20, and is fed to the fixing unit 31 along the image-support member conveying path 24. After the developed image transferred on the paper P is fixed thereon by the fixing unit 31, the discharging direction is selected by the discharge sheet selector 32 so that the paper P with the fixed image is discharged to the upper sheet discharge tray 8 or the front sheet discharge tray 12.

After the developed image is transferred onto the paper P, the toner remaining on the photosensitive drum 15 is cleaned off by the cleaning device 21 and the image forming apparatus becomes ready for the next copying operation.

Figure 5:
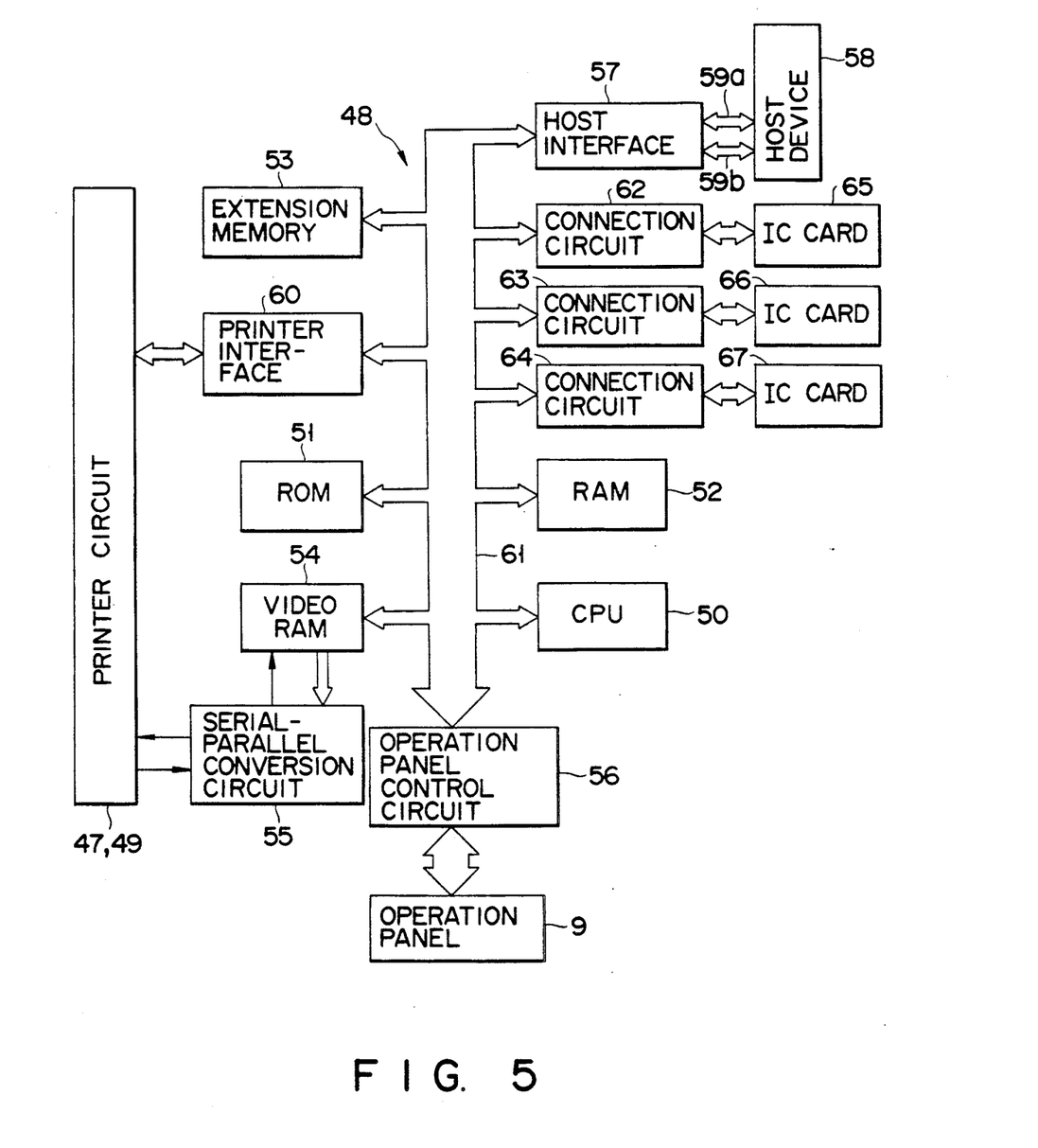
FIG. 5 is a block diagram illustrating the structure of the essential section of an electric circuit of the embodiment shown in FIG. 1.

FIG. 5 illustrates the essential section of the electric circuit of the printer control section 48. Referring to this diagram, a CPU 50 performs the general control of the image forming apparatus, and a ROM 51 stores a control program according to which the CPU 50 operates. Stored in the ROM 51 are a password (ID number) which should be referred to upon data alteration and other data associated with the paper P such as the top margin, left margin and paper type. A RAM 52 is used as a page buffer for temporary storage of image data sent from a host device 58 or a working buffer for the CPU 50. An extension memory 53 is a large-capacity memory which is used when image data from the host device 58 is bit-map data or the like so that the RAM 52 cannot store data for one page. A video RAM 54 stores image data developed into a bit image, and its output is supplied to a serial-parallel conversion circuit 55. The serial-parallel conversion circuit 55 converts image data, developed into a bit image in the video RAM 54 and transferred as parallel data therefrom, into serial data and outputs this data to the printer circuits 47, 49.

A host interface 57 serves to exchange data between the host device 58, which may be constituted by a computer or an image scanner, and the printer control section 48. The host interface 57 has two types of transfer lines, a serial transfer line 59a and a parallel transfer line 59b, and can selectively use these lines in accordance with the type of data transferred to or from the host device 58. A printer interface 60 serves to permit the use of a control signal line between the printer control section 48 and the printer circuits 47, 49. Connection circuits 62 to 64 control power supply to and power cutoff from the IC cards 65–67 at the time the IC cards are inserted into or removed from the present apparatus. This control will be described in detail later.

An operation panel control circuit (first and second control means) 56 permits the LCD unit 9a of the operation panel 9 to display and transfer data, entered through the switches 9c, to the CPU 50. An internal bus 61 serves to exchange data between the CPU 50, ROM 51, RAM 52, extension memory 53, video RAM 54, operation panel control circuit 56, host interface 57, printer interface 60 and connection circuits 62–64. The IC cards 65–67 are each constituted by a nonvolatile memory, such as a battery-backed-up static RAM, EEPROM, EPROM or mask ROM. These IC cards 65–67 are colored distinctively depending on the types of the above memories and the functions associated with the memory contents. For instance, an IC card of a mask ROM type having font data recorded therein may be colored blue, and an host device of a static RAM type having emulation data recorded therein may be colored orange. This permits a user to confirm at a glance the type of a IC card in use and the type of data written in the card.

Figure 6:
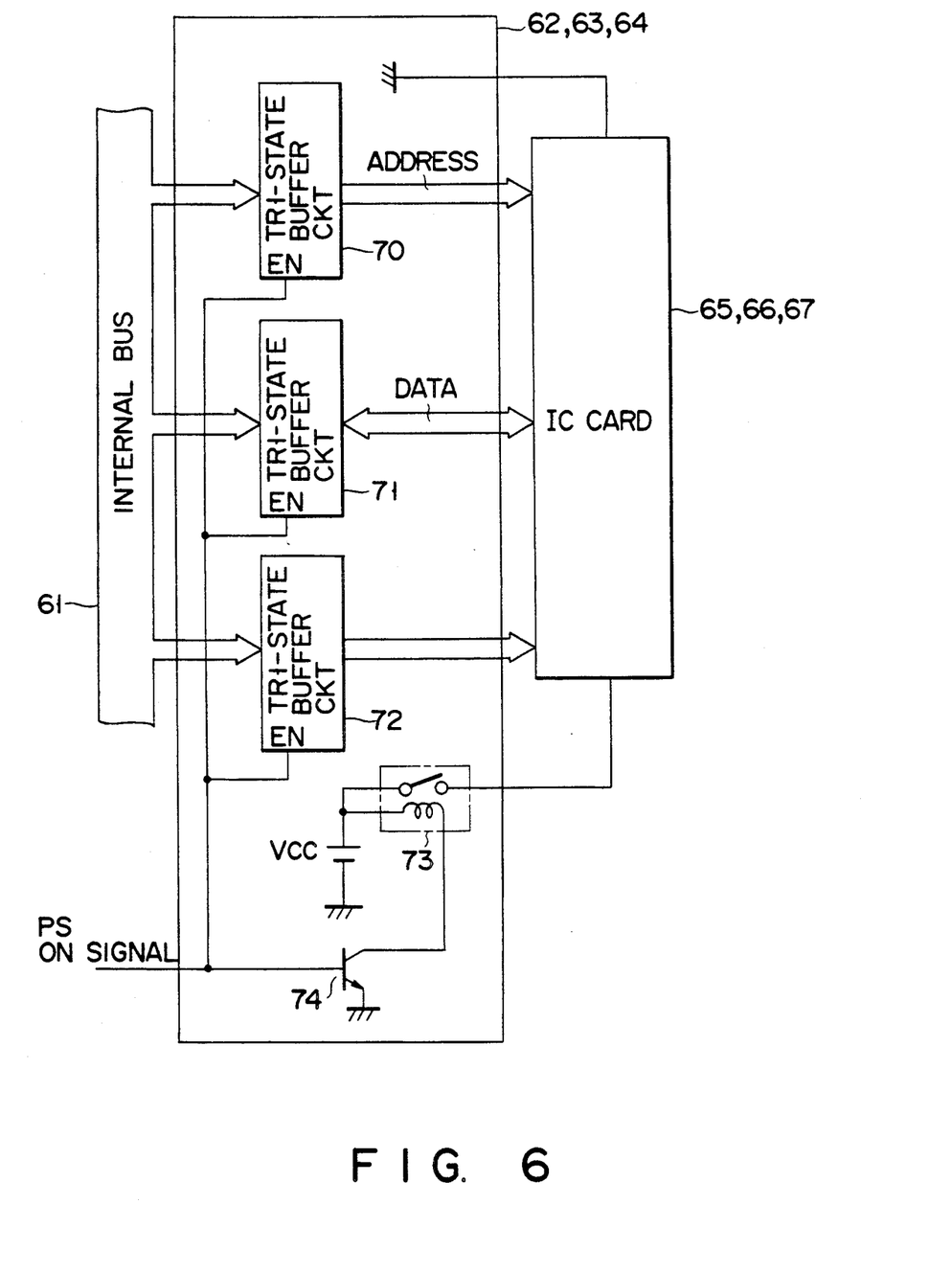
FIG. 6 is a block diagram illustrating a connection circuit for the IC card.

The connection circuits (control means) 62–64 each have a structure as shown in FIG. 6, and function in such a way that when the IC cards 65–67 are inserted into or removed from the connecters 10a–10c, power supply to these cards is cut off, and the signal lines to the cards are disabled, thus preventing data stored in the IC cards 65–67 from being destroyed due to noise which otherwise is likely to occur upon insertion or removal of the cards.

The connection circuits 62–64 each comprise a tri-state buffer circuit 70 for disabling an address signal line to stop address data from the internal bus 61, a tri-state buffer circuit 71 for disabling a data signal line, a tri-state buffer circuit 72 for disabling a control signal line, a power source $V_{CC}$ for supplying power to the IC cards 65–67, a relay circuit 73 for permitting or inhibiting the output of the power source $V_{CC}$, and a transistor 74 for driving the relay circuit 73.

At the time the IC cards 65–67 are inserted to or removed from the present apparatus, a PS ON signal from the CPU 50 is disabled first to inhibit the output of the transistor 74. This opens the contact of the relay circuit 73 to thereby cut off the power supply to the IC cards 65–67. A signal to be supplied to an enable (EN) terminal of each of the tri-state buffer circuits 70–72 is also disabled, rendering the output terminal of each tristate buffer circuit at a high impedance state. As a result, the connection circuits 62–64 are electrically separated from the IC cards 65–67, respectively. The IC cards 65–67 in this state are inserted into or removed from the connectors 10a–10c. At the time power is supplied to the IC cards 65–67, with the cards electrically separated from the connection circuits 62–64 in the above manner, the cards are inserted into the connectors 10a–10c and the PS ON signal from the CPU 50 is enabled to turn on the transistor 74. As a consequence, the contact of the relay circuit 73 is closed, so that power supply to the IC cards 65–67 starts. Further, since the signal to be supplied to the EN terminal of each tristate buffer circuit 70, 71 or 72 is also enabled, data supplied to its input terminal appears as it is on the output terminal. Accordingly, the connection circuits 62–64 are electrically coupled to the respective IC cards 65–67 thus permitting data to be read from or written in the cards.

A description will now be given of the operation of the present image forming apparatus with the above structure for down-loading data and writing the down-loaded data (predetermined data) in the IC card 65 referring to the flowchart shown in FIG. 7. The CPU 50 permits the LCD unit 9a of the operation panel 9 to display that down-loading is permitted (step S1). When the operator sets the apparatus in ON-line state in response to the message, down-loading of data is initiated (step S2). More specifically, data transferred over the data transfer line 59a or 59b to the host interface 57 from the host device 58 is sequentially stored in the RAM 52 via the internal bus 61.

After down-loading the data to the RAM 52 is completed, writing the down-loarded data into the IC card is instructed in step S3 from the operation panel 9, and it is discriminated whether or not the IC card 65 is actually inserted into the connector 10a (step S4). If the decision is negative, the CPU 50 displays the insertion of the IC card on the control panel 9a at stop 11 and waits for data denoting that the operator has inserted the IC card 65 (steps S4 and S11). When the data is entered, the CPU 50 enables the PS ON signal again (step S5) and goes to step S6. The loop of steps S4 to S11 is repeated until insertion of the IC card 65 is actually detected in the above manner.

When it is discriminated in step S4 that the IC card 65 has actually been set in the proper position, it is then checked if no data has been written in the card yet (step S6). If it is discriminated that data has already been written in the IC card, a message to that effect is output to ask if re-writing of the IC card can be performed or not to the operator (step S7). When the answer is no, the flow then returns to step S4 via steps S12 and S13 and the aforementioned operational sequence is repeated.

When the IC card 65 is actually inserted and it is discriminated that no data has been written in the card yet or the re-writing can be performed, the flow advances to step S8 where the down-load data stored in the RAM 52 is sequentially written in the IC card 56. In this manner, in loading emulation data, font data, etc. to the RAM 52 next, the data can be loaded from this IC card 65, not from the host device 58.

Since down-load data temporarily loaded into the RAM 52 is written in each of the IC cards 65–67 in response to an instruction entered from the operation panel 9, as described above, the same data can be loaded to the RAM 52 next time from the associated IC card, not from the host device 58. Accordingly, the host device 58 need not perform down-loading of data every time power to the image forming apparatus is cut off or an operation mode is changed, thus increasing the effective use of the host device.

Since the connection circuits 62 to 64 are provided to permit the cutoff of power and a signal to the IC cards 65–67, it is possible to insert the IC cards in the apparatus or remove them therefrom without cutting off power to the entire apparatus, enhancing the operability.

In addition, the IC cards 65–67 used in the present image forming apparatus are colored distinctively depending on the types of the cards and the contents of data stored in the cards, thus making the apparatus easier to operate.

Figure 8:
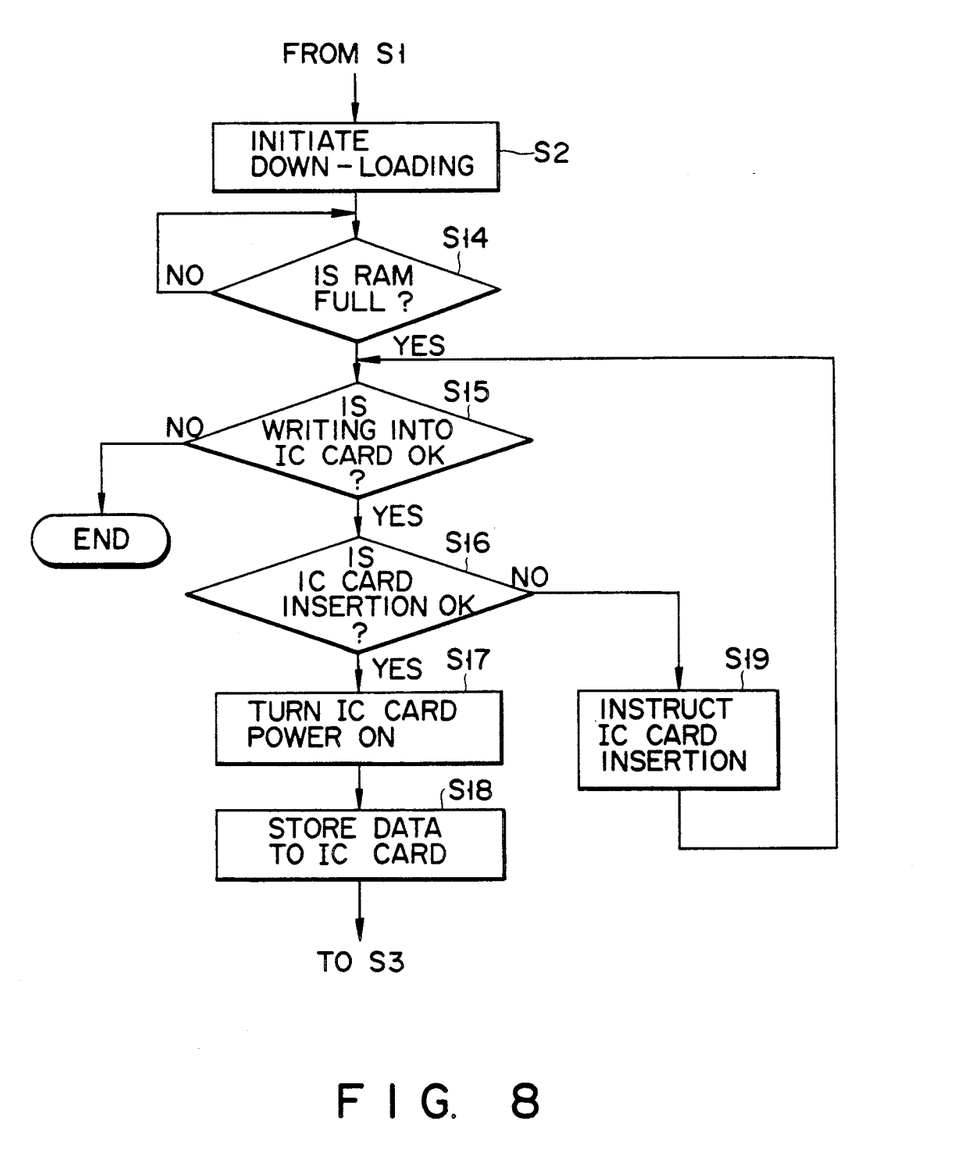

The image forming apparatus equipped with the above IC cards 65–67 can be designed in such a way that as shown in the flowchart of FIG. 8. In FIG. 8, it is discriminated in step S14 whether or not the RAM 52 becomes fully loaded while data is being down-loaded from the host device 58 in step S2, and when the decision is positive (YES), the IC card 65, 66 or 67 in use can be used as an extension memory to continue the down-loading (steps S15 and S18). In this case, the RAM incorporated in the apparatus need not have a large capacity, thus providing a low-cost and easy-to-operate image forming apparatus flexible in expanding a memory. The memory expansion capability can be applied not only data down-loading but also to a case of insufficient memory for some other reasons.

Figure 7:
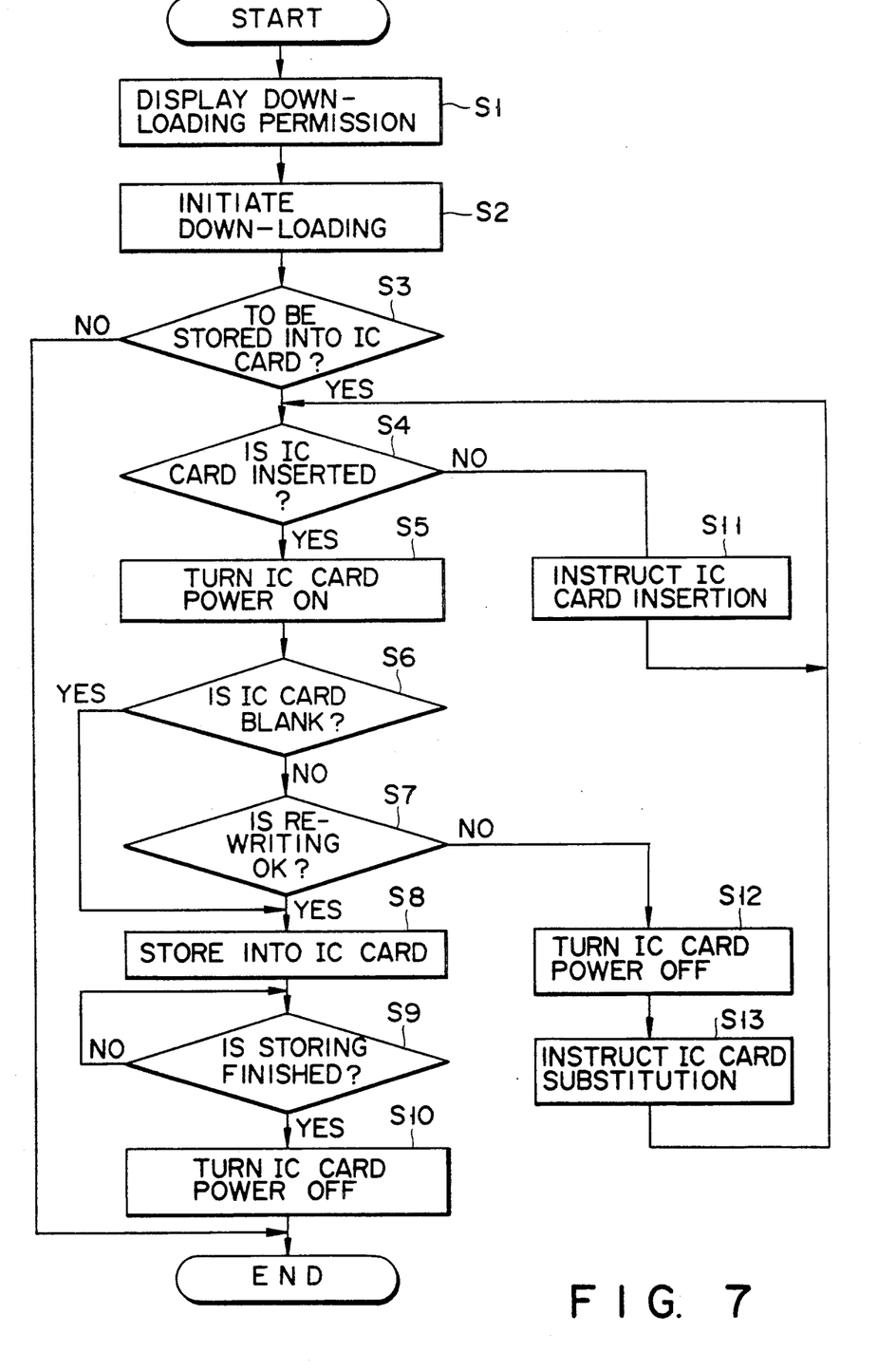
FIGS. 7 through 10 are flowcharts for explaining the operation of the embodiment of FIG. 1.
Figure 9:
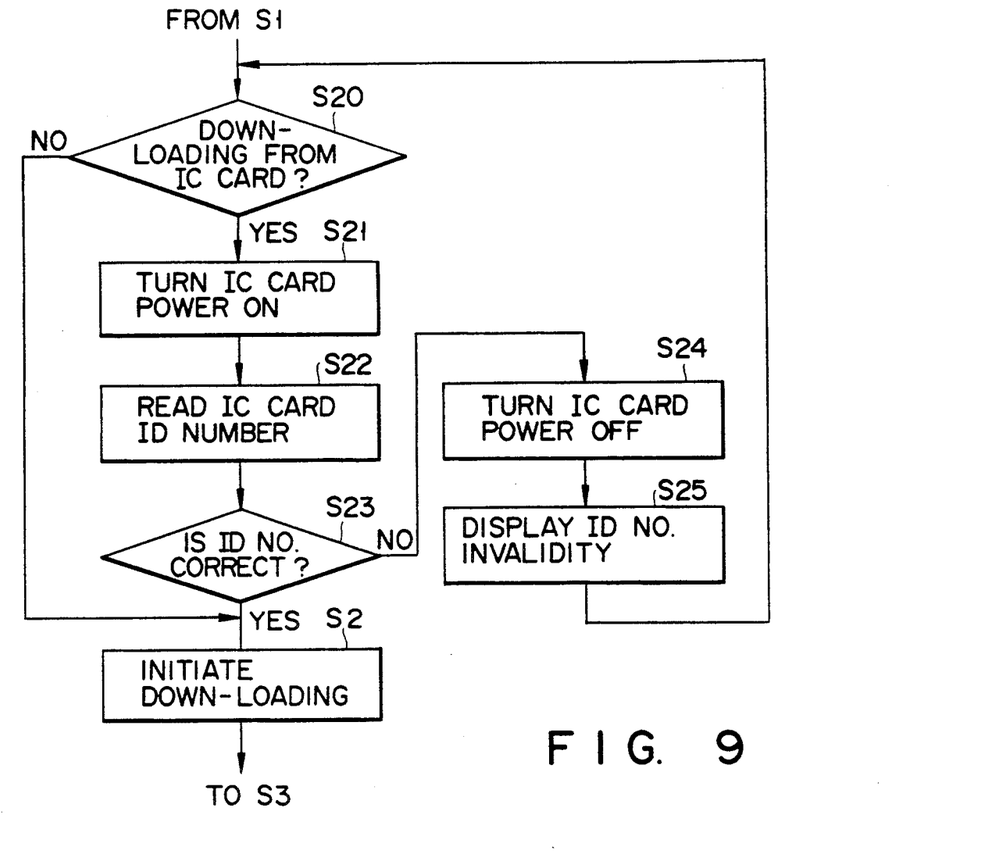

Furthermore, a password or an ID number may be written in the IC cards 65–67 in advance so that the operation advances to step S2 in FIG. 7 to permit the use of the image forming apparatus only if the ID number is found to be correct in steps S22 and S23 in FIG. 9. In this case, the total number of copies made may be stored in the associated IC card 65, 66 or 67 and the memory contents may be referred to using the operation panel 9. This contributes to charging the user.

Figure 10:
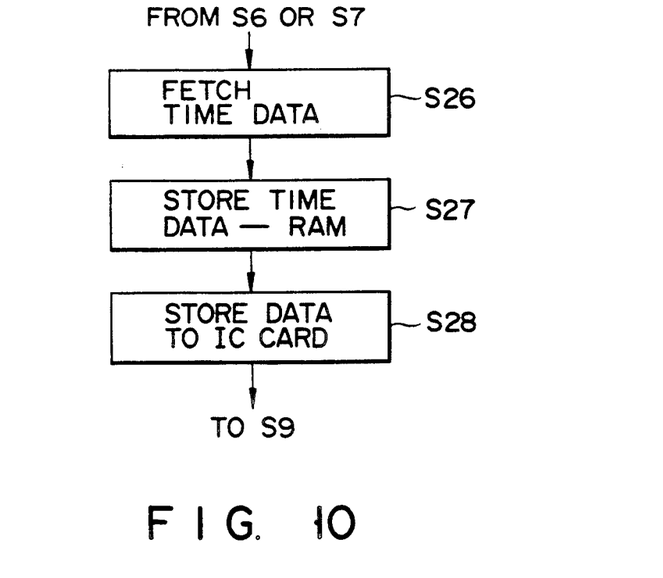

The IC cards 65–67 may also be provided with a timer function so that in storing fixed data such as format data in the associated IC card, the date on which the fixed data is stored is also stored in the card as indicated in steps S26 and S27 in FIG. 10. This modification permits the operator to confirm the date of storage of the data upon reading out the data from the associated IC card and easily discriminate how old the data is. Accordingly, the operator can always update the copying operation based on the latest data.

As described above, the present invention can provide an image forming apparatus with higher operability, which does not require down-loading of down-load data from a host device every time power is given or the operation mode is changed, can permit a portable memory medium to be inserted in or removed from the present apparatus even when the apparatus is activated, and can permit an operator to distinguish, at a glance, the type of a portable memory medium in use.

What is claimed is:

1. An image forming apparatus initialized by down-loading predetermined initialization data from a host device to a load memory means for storing the predetermined data, comprising:

first loading means for loading said predetermined initialization data to said load memory means from said host device;

first instruction means for giving an instruction to write the predetermined initialization data stored in said load memory means into a memory medium from said load memory means;

second loading means for loading the predetermined initialization data stored in said memory medium to said load memory means from said memory medium; and memory control means for writing into said memory medium said predetermined initialization data loaded to said load memory means from said host device by said first loading means when instructed by said first instruction means, and loading said predetermined initialization data stored in said memory medium to said load memory means when said memory medium having said predetermined initialization data loaded into is set in said apparatus, thereby executing initialization of said image forming apparatus, wherein said memory control means includes first means for detecting whether said memory medium is blank or not when the predetermined initialization data is being written into said memory medium and second means for detecting whether rewriting of said memory medium is permissible when it is detected by the first means that the memory medium is not blank.

2. An image forming apparatus according to claim 1, further comprising:

receiving means for receiving said memory medium;

second instruction means for giving a power supply instruction to supply power to said memory medium set in said receiving means or a power stop instruction to stop power supply to said memory medium; and power supply control means for controlling power supply or stoppage of power supply to said memory medium in accordance with the instructions from said second instruction means, whereby at a time said memory medium is set in or removed from said receiving means, power to said memory medium is cut off in response to the power stop instruction from said second instruction means, and when said memory medium is set in said receiving means, power is given to said memory medium in response to the power supply instruction from said second instruction means.

3. An image forming apparatus according to claim 1, wherein said first loading means includes a RAM and means for down loading data from said host device to said memory medium when said RAM is fully loaded.

4. An image forming apparatus according to claim 1, further comprising means for checking validity of said memory medium.

5. An image forming apparatus according to claim 1, wherein said memory medium has a timer function for outputting time data and means for storing said time data as well as the predetermined data from said load memory means.

6. An image forming apparatus according to claim 1, wherein said memory medium includes an externally provided memory medium.

7. An image forming apparatus according to claim 6, wherein said memory medium includes a portable memory medium.

8. An image forming apparatus according to claim 7, wherein said portable memory medium includes an integrated circuit (IC) card.

* * * * *